(No Model.)
M. LESTER.
ATTACHMENT FOR UNLOADING BOX CARS.
No. 505,558. Patented Sept. 26, 1893.
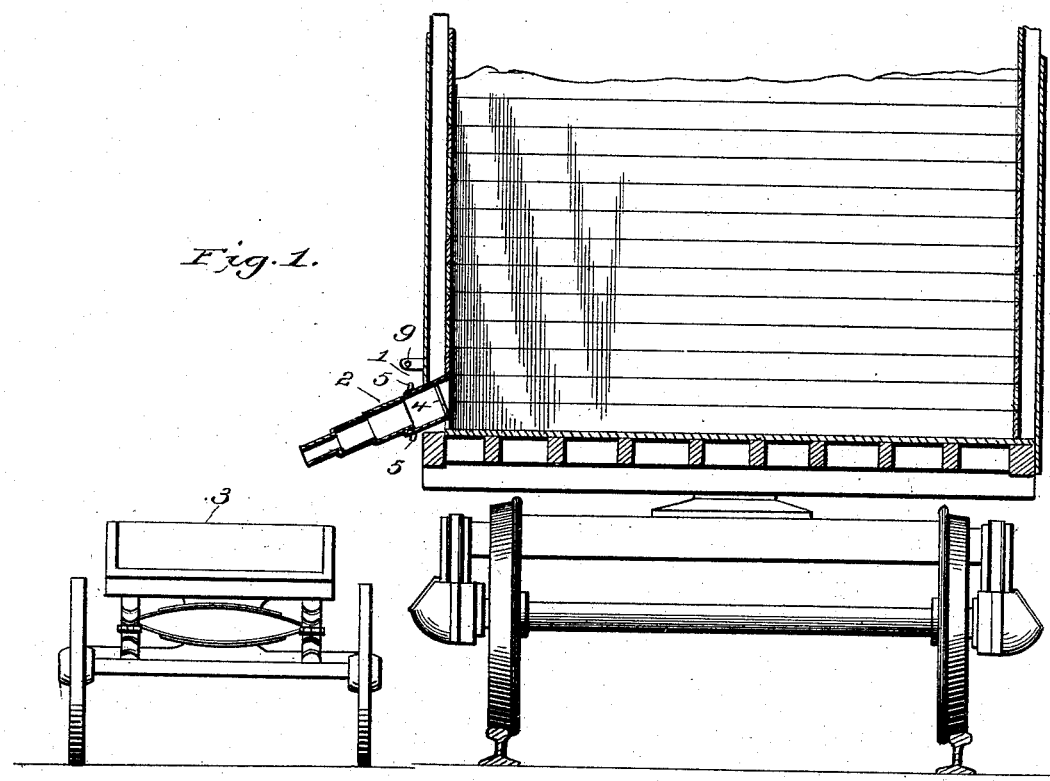
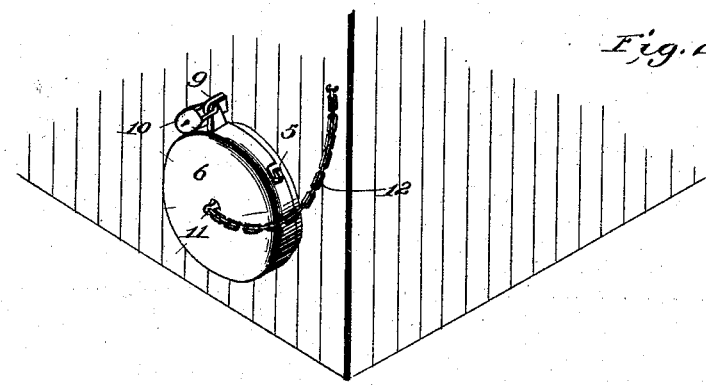
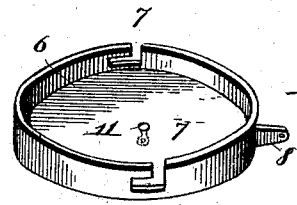
Witnesses.
N Moffett.
B. T. Welch Jr.
Inventor:
M. Lester.
By Glasco & Leo,
Attorneys

United States Patent Office.

MAME LESTER, OF LOGANSPORT, INDIANA.

ATTACHMENT FOR UNLOADING BOX-CARS.

SPECIFICATION forming part of Letters Patent No. 505,558, dated September 26, 1893.

Application filed November 2, 1892. Serial No. 450,746. (No model.)

*To all whom it may concern:*

Be it known that I, MAME LESTER, a citizen of the United States, residing at Logansport, in the county of Cass and State of Indiana, have invented a certain new, useful, and valuable Improvement in Attachments for Unloading Box-Cars, of which the following is a full, clear, and exact description.

My invention has relation to attachments for unloading box cars. Said attachment consists of a telescopic chute placed in a slanting position near the bottom of the side of the car. Said chute when in used is adapted to extend out a sufficient distance to convey the freight from the car to the body of a wagon or any other suitable receptacle. Said chute is so constructed as to be folded up, when not in use in a manner similar to the folding of an ordinary telescope, and a suitable cap is placed over the outer mouth of the chute, said cap being held in place by a suitable lock.

In the accompanying drawings—Figure 1, is a transverse sectional view of the car showing the chute extended. Fig. 2 is a perspective view of the end of the car showing the cap on the end of the sleeve and Fig. 3 is a perspective view of the under side of the said cap.

My invention is described as follows: It consists of a sleeve 1, secured in the side of the box car near the bottom of the car, said sleeve adapted to hold a number of extension sections 2. The said sections 2, when extended form a chute which slants in a downward direction and extends beyond the side of the car a sufficient distance to convey the freight to the wagon 3, or other suitable receptacle. When the extensions are not in use they are pushed in the sleeve one extension telescoping in the next one nearest the car and to prevent the extensions from going into the car, the rod 4, is placed across the inner mouth of the sleeve 1. The outer end of the sleeve 1, extends about two inches beyond the side of the car and is provided with a pair of lugs 5. The cap 6, that fits over the outer end of the sleeve 1, has in its rim the L-shaped slots 7. Said slots are adapted to fit round the lugs 5, and thereby hold the cap to the sleeve. Said cap is also provided with an arm 8, which when the cap is on is adapted to come in contact with the arm 9, on the side of the car. Said arms 8, and 9, are provided with suitable perforations and through these perforations the shank of the lock 10, is passed and thereby the cap cannot be removed without removing the lock. In the middle of the cap is swiveled a suitable eye 11, to which is attached one end of the chain 12, the other end of the said chain being attached by a suitable staple to the side of the car.

This chute is adapted to unload wheat, pulverized lime or other analogous substances and as many of these chutes may be used on either or both sides of the car as desired.

Having described my invention, what I claim as new, and desire to secure by Letters Patent, is—

In an unloading device the combination of a telescopic chute, a cap adapted to close the outer end of the said telescopic chute, said cap having a perforated arm; a stationary perforated arm attached to the outside of the unloading receptacle; the perforations in the said arms adapted to hold the bail of a suitable lock, substantially as shown and described.

In testimony whereof I affix my signature in presence of two witnesses.

MAME LESTER.

Witnesses:
O. M. BRYANT,
A. E. GLASCOCK.